United States Patent
Rau

[15] 3,653,731
[45] Apr. 4, 1972

[54] ROLLER BEARING
[72] Inventor: John C. Rau, 21880 Daisy Lane, Southfield, Mich. 48075
[22] Filed: Aug. 14, 1970
[21] Appl. No.: 63,742

[52] U.S. Cl. ............................308/184, 308/214
[51] Int. Cl. .........................F16c 19/04, F16c 33/64
[58] Field of Search ......................308/184, 212, 1, 214

[56] References Cited

UNITED STATES PATENTS 3,404,925  10/1968  Bailey.................................308/184

FOREIGN PATENTS OR APPLICATIONS 408,283  1/1910  France................................308/184

Primary Examiner—Edgar W. Geoghegan
Assistant Examiner—Frank Susko
Attorney—Barnard, McGlynn & Reising

[57] ABSTRACT

A roller bearing having a cantilevered outer race design to relieve Hertzian stress. The outer annulus of the outer race may also be slotted to control resilience.

16 Claims, 4 Drawing Figures

PATENTED APR 4 1972 3,653,731

INVENTOR.
John C. Rau
BY
Barnard, McGlynn & Reising
ATTORNEYS

ROLLER BEARING

This invention relates to bearings and more particularly to the construction of an outer race for an anti-friction roller bearing for the purpose of effecting load transfer and improved bearing life.

A major cause of roller bearing failure is the inadequate transfer of Hertzian stress loads to the outer race. This inadequate transfer often results in a substantially nonuniform stress distribution over the roller, leading to gouging of the races and eventually to the failure of the bearing. This situation is aggravated by slight dimensional nonuniformities in the rollers or races.

In accordance with the invention, Hertzian stress transfer and improved bearing operation is accomplished by way of a bearing having an outer race structure with a radially resiliently supported portion in contact with the rollers. This permits adjustment between the inner and outer races to accommodate contact and stress load irregularities.

In a preferred embodiment of the invention the bearing comprises an inner race, a plurality of rollers, a cage or separator and an outer race which is so constructed as to provide an outer annulus securable to a load and an inner annulus integral with the outer annulus and resiliently pivotally supported thereby for engagement with the rollers. The inner annulus is effectively cantilevered relative to the outer annulus by means of an integral joint to permit essentially radial flexure of the outer annulus as required to effect a transfer of roller loads to the outer race.

In a specific embodiment illustrated herein the flexure between the inner and outer annuli of the outer race is limited by means of a portion of one annulus which extends radially into spaced relation with the other annulus. This may permit the construction of the bearing from lighter stock and also prevent the flexure of the outer race beyond the elastic limit under abnormally high load conditions.

According to a further feature of the invention, the outer annulus of the outer race may be varied in a selected structural characteristic to vary the degree of resilience of the roller supporting surface relative to the outer annulus. For example, the outer annulus may be slotted axially at spaced intervals about the circumference. Alternatively, the inner annulus may be tapered, i.e., axially nonuniform in thickness.

The invention is applicable to both straight and tapered rollers as well as both true radial and radial-thrust bearings as will be apparent from the foregoing description of several illustrative embodiments, this description being taken with the accompanying drawings of which:

Figure 1:
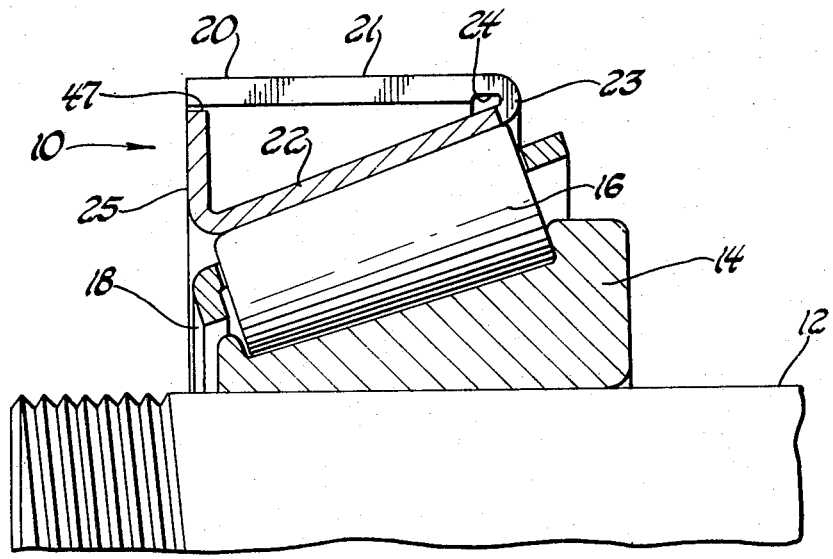
FIG. 1 is a cross-sectional view of a first bearing assembly of the radial-thrust type.

Referring now to FIG. 1, a first bearing assembly 10 is shown mounted, as an example, on a front wheel spindle 12. Bearing assembly 10 comprises a solid inner race 14 having an inclined bearing surface for receiving a plurality of tapered rollers 16. The rollers 16 are maintained in spaced relationship with one another by means of a conventional cage or separator 18. Bearing assembly 10 further comprises an outer race 20 having an outer annulus 21 which is axially flat so as to be securable to a load, and an inner annulus 22 which is inclined to engage the rollers 16. The outer annulus 21 is integrally joined with the inner annulus 22 by means of a pivot joint 23 having a relieved area 24 to minimize stress concentrations and fatigue. The inner and outer annular portions 22 and 21 intersect one another at an acute angle of approximately 22 ½°. Int Integrally formed with the inner annular portion 22 is a radially extending lip portion 25 which is radially spaced from the inner surface of the outer annular portion 21 by means of a gap 47 to limit the deflection of the inner annular portion 22 about the pivot joint 23. The gap 47 between the radially extending lip portion 25 of the outer race and the outer annulus 21 may be on the order of 0.010 inch or less. All of the elements of the assembly 10 are preferably fabricated from steel; the outer race 20 preferably having a hardness of 60 or more on a Rockwell "C" scale.

Figure 2:
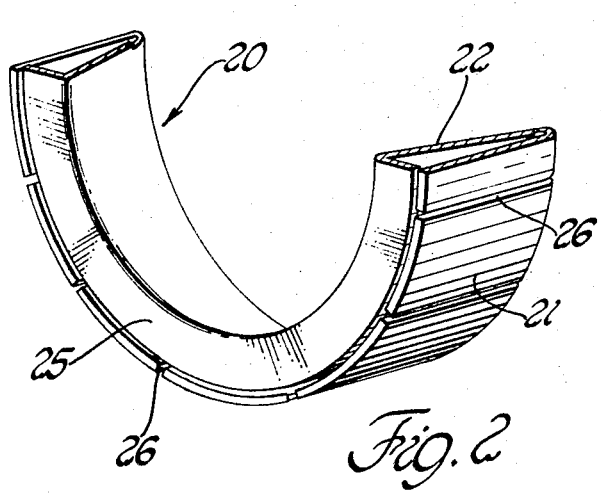
FIG. 2 is a perspective view of the outer race of the assembly of FIG. 1.

FIG. 2 shows the outer race 20 of the assembly 10 in greater detail. It can be seen in FIG. 2 that slots 26 are cut into the outer annulus 21 so as to extend in the axial direction at circumferentially spaced intervals. The number and spacing of slots 26 is selected from zero to 16 or more so as to enhance the resilient or flexural characteristic of the race 20 as desired. The width of each slot is preferably between 0.010 and 0.125 inches.

Figure 3:
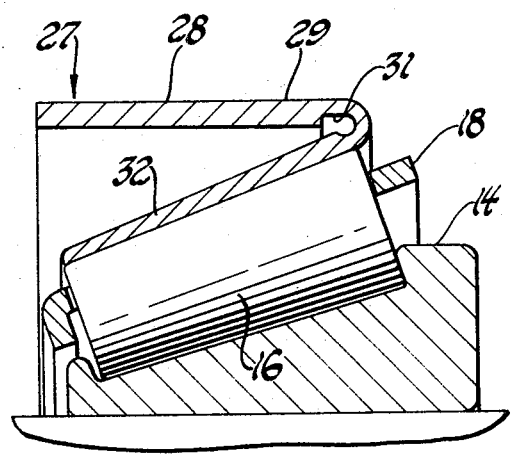
FIG. 3 is a cross-sectional view of a second radial-thrust type bearing assembly; and, FIG. 4 is a cross-sectional view of a pure radial bearing using straight rollers.

Referring now to FIG. 3, a second bearing assembly 27 is shown to comprise an inner race 14, a plurality of tapered rollers 16, a cage or separator 18 and an outer race 28. Obviously, structurally like elements as between FIGS. 1 and 3 are identified by the same reference. Outer race 32 is made up of the integral assembly of an outer annulus 29 having a nonuniform or axially tapered thickness and an inner annulus 32, the plane of which intersects the plane of the outer annulus 29 at an acute angle. The flexural joint area is internally relieved at 31 to minimize stress concentrations as before. Again the outer race 28 is constructed of steel so as to be satisfactorily resilient, yet strong, to permit transfer of loads from the rollers 16 to the outer race 28 by means of the pivotal flexure and essentially radial displacement of the inner annulus 32 relative to the outer annulus 29. The degree of taper of annulus 29 is variable to vary the beam characteristics of annulus 32.

Figure 4:
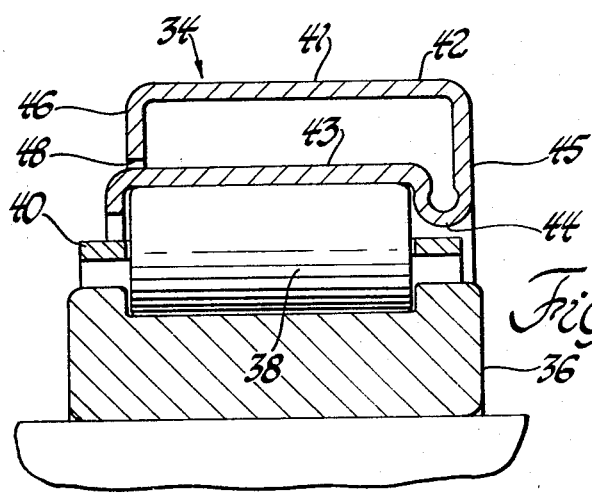

Referring now to FIG. 4, a third bearing assembly 34 is shown to comprise an inner race 36 having a flat bearing surface for receiving a plurality of straight or cylindrical rollers 38. The rollers 38 are maintained in spaced relationship by means of a cage or separator 40. Bearing assembly 34 further includes an outer race 41 having parallel outer and inner annular portions 42 and 43, respectively. The outer and inner annular portions are maintained in spaced relationship by means of an integral flexural joint 44 having a small radius of curvature and generally radially extending joining portion 45. At the free end of the outer annular portion 41 an inturned radially extending lip portion 46 extends toward but is spaced from the lefthand end of the inner annulus 43 as shown in FIG. 4. The spacing between the radially extending lip portion 46 and the inner annulus 43 again defines a gap 48 of between five and ten thousandths of an inch to limit the essentially radial deflection of the inner annulus 43 relative to the secured outer annulus 41.

It is to be understood that the foregoing descriptions are illustrative in character and are not to be construed in a limiting sense.

The embodiments of the invention in which an exclusive property or privilege is claimed are defined as follows:

1. A roller bearing assembly comprising an inner race, a plurality of rollers disposed over the inner race, an outer race having an inner annular portion defining a flat inner surface to receive said rollers and an outer annular portion securable to a load, the inner annular portion being in engagement with the rollers, the inner and outer annular portions being resiliently and pivotally interconnected along a first side to produce a cantilevered suspension of said inner annular portion and to permit pivotal flexure of the inner annular portion relative to the outer annular portion, and stop means extending partially and substantially radially between the inner and outer portions along a second side to define the limit of said pivotal flexure.

2. The roller bearing assembly defined in claim 1 wherein the rollers are straight.

3. The roller bearing assembly as defined in claim 1 wherein the rollers are tapered.

4. The roller bearing assembly defined in claim 1 including a separator for maintaining a predetermined relationship between the rollers.

5. The roller bearing assembly defined in claim 1 wherein the inner and outer annular portions of the outer race are integral.

6. The bearing assembly defined in claim 1 wherein the inner and outer annular portions are parallel.

7. The bearing assembly defined in claim 1 wherein the planes of the inner and outer annular portions intersect at a predetermined acute angle.

8. The bearing assembly defined in claim 1 wherein the inner and outer annular portions are integrated with one another by means of a resilient joint which is of lesser thickness than the outer annular portion.

9. The bearing assembly defined in claim 1 wherein the outer annular portion is axially slotted at spaced intervals about the circumference thereof.

10. The bearing assembly defined in claim 1 wherein the thickness of the inner annular portion is axially nonuniform.

11. The bearing assembly of claim 1 wherein the stop means for limiting comprises a radially extending lip portion integral with said inner annular portion.

12. An outer race for use in a tapered roller bearing assembly comprising an outer annular portion and an inner annular portion, the inner annular portion having a flat inner surface to receive tapered rollers in contact therewith, the outer and inner annular portions being integrally formed to define a stress-relieved flexural joint along one common side thereof to permit essentially pivotal displacement of the inner annular portion relative to the outer annular portion in the fashion of a cantilevered beam.

13. The race defined in claim 12 wherein the inner and outer annular portions intersect at an acute angle.

14. The race defined in claim 12 wherein the outer annular portion is axially slotted at spaced intervals about the circumference thereof.

15. The bearing race defined in claim 12 wherein the inner and outer annular portions are parallel.

16. The race defined in claim 12 including stop means for limiting the essentially radial displacement between the inner and outer annular portions.

* * * * *